No. 696,756. Patented Apr. 1, 1902.
W. RUNDQUIST.
JEWEL SETTING MACHINE.
(Application filed Nov. 6, 1901.)
(No Model.) 6 Sheets—Sheet 1.

Fig. 1.

Witnesses
Inventor
William Rundquist
by Edwen Bros
Attorneys

No. 696,756. Patented Apr. 1, 1902.
W. RUNDQUIST.
JEWEL SETTING MACHINE.
(Application filed Nov. 6, 1901.)
(No Model.) 6 Sheets—Sheet 4.

Witnesses
Inventor
William Rundquist
by Edson Bros
Attorneys

No. 696,756. Patented Apr. 1, 1902.
W. RUNDQUIST.
JEWEL SETTING MACHINE.
(Application filed Nov. 6, 1901.)
(No Model.) 6 Sheets—Sheet 5.

Witnesses
Inventor
Wm Rundquist
By Edson Bros.
Attorneys

No. 696,756. Patented Apr. 1, 1902.
W. RUNDQUIST.
JEWEL SETTING MACHINE.
(Application filed Nov. 6, 1901.)
(No Model.) 6 Sheets—Sheet 6.

Witnesses
Inventor
William Rundquist
by Edson Bro's
Attorneys

UNITED STATES PATENT OFFICE.

WILLIAM RUNDQUIST, OF ELGIN, ILLINOIS.

JEWEL-SETTING MACHINE.

SPECIFICATION forming part of Letters Patent No. 696,756, dated April 1, 1902.

Application filed November 6, 1901. Serial No. 81,355. (No model.)

*To all whom it may concern:*

Be it known that I, WILLIAM RUNDQUIST, a citizen of the United States, residing at Elgin, in the county of Kane and State of Illinois, have invented certain new and useful Improvements in Jewel-Setting Machines; and I do hereby declare the following to be a full, clear, and exact description of the invention, such as will enable others skilled in the art to which it appertains to make and use the same.

My invention relates to improvements in watchmakers' machines, more especially for jewel-setting. It has for its objects, among other things, to provide for automatically forming the settings for the jewels and for securing said jewels therein, to facilitate operation, to promote efficiency, and to generally improve the utility of the invention.

It consists of the sundry combinations of parts, including their general construction and arrangement, substantially as hereinafter more fully disclosed and specifically pointed out by the claims.

In the accompanying drawings, illustrating the preferred embodiment of my invention.

Latitude is allowed herein as to details, as they may be changed or varied at will without departing from the spirit of my invention and the same remain intact and yet be protected.

In carrying out my invention I mount upon a suitable support or framework 1 a tool-carrier 2, having, preferably, a dovetailed sliding connection, as at $1^2$. Said carrier or head, unlike the corresponding part as heretofore employed in this class of machines, slides horizontally opposite the stock delivering or feeding device or chuck in performing the several operations of treating the stock and securing the jewels therein, as more fully disclosed presently. Said carrier or head is preferably constructed, as shown, having forward and rear transverse vertical portions $1^b\,1^b$, each provided with a number of holes $1^c$, those in one portion alining those in the other portion, and within these holes are arranged spindles $2^a$, carrying the respective tools employed in this class of machines. Said spindles are each fitted with or have clamped thereon a split collar 3 just inside of the rear transverse portion $1^b$, having a bifurcated lower end, as at $3^a$, receiving a rod or guide 4, fixed to said rear transverse portion and projecting forward a distance or being of a length corresponding to the movement of the spindles, said collars having their bifurcated portions riding upon said rods or guides to prevent axial movement or turning of said spindles. Said spindles have applied thereto or are encompassed for a portion of the length thereof by springs 5, one end of each being secured to a spindle and the opposite end bearing against a transverse portion of the carrier or head 2 to cause said spindles to respond automatically and promptly under the action of their common actuating-lever mechanism, as presently seen. The tension of said springs can be readily adjusted or stressed by suitably manipulating nuts $5^a$, applied to said spindles outside of said rear transverse portion of the carrier or head. The rear end of said spindles are provided with spherical or globular-like enlargements or terminals $5^b$, and a coupling or head 6, having a cylindric socket $6^a$, with a longitudinal slot $6^x$ through its forward side to successively receive said spherical enlargements or terminals, is carried by and flexibly or pivotally connected to the upper end of a lever 7, suitably fulcrumed in the frame or support 1. Said coupling or head has both its socket and slot opening out through both its ends to permit the insertion of said spherical enlargements or terminals into said socket in effecting connection between said coupling and the spindles, also to allow the passage of said terminals or enlargements through said socket, to permit the withdrawal of said enlargements or terminals as the carriage is intermittently moved transversely or at right angles thereto in bringing the several tools in action.

Figure 2:
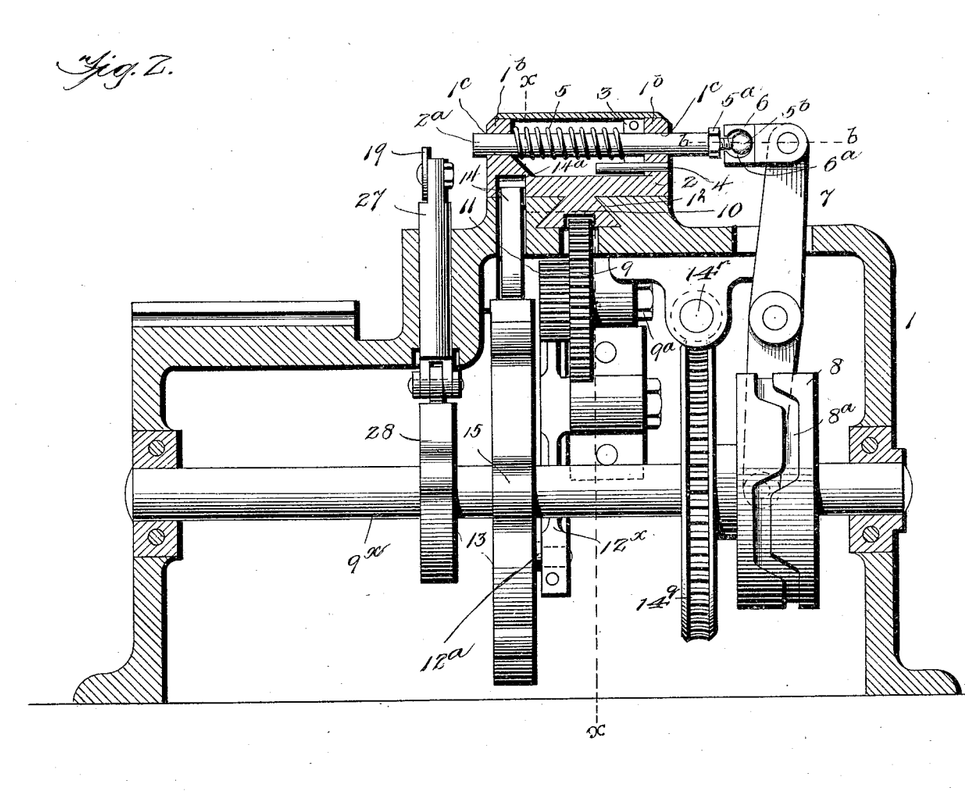
Fig. 2 is a sectional elevation of the machine carrier or head, taken on the line $w\,w$ of Fig. 3.
Figure 3:
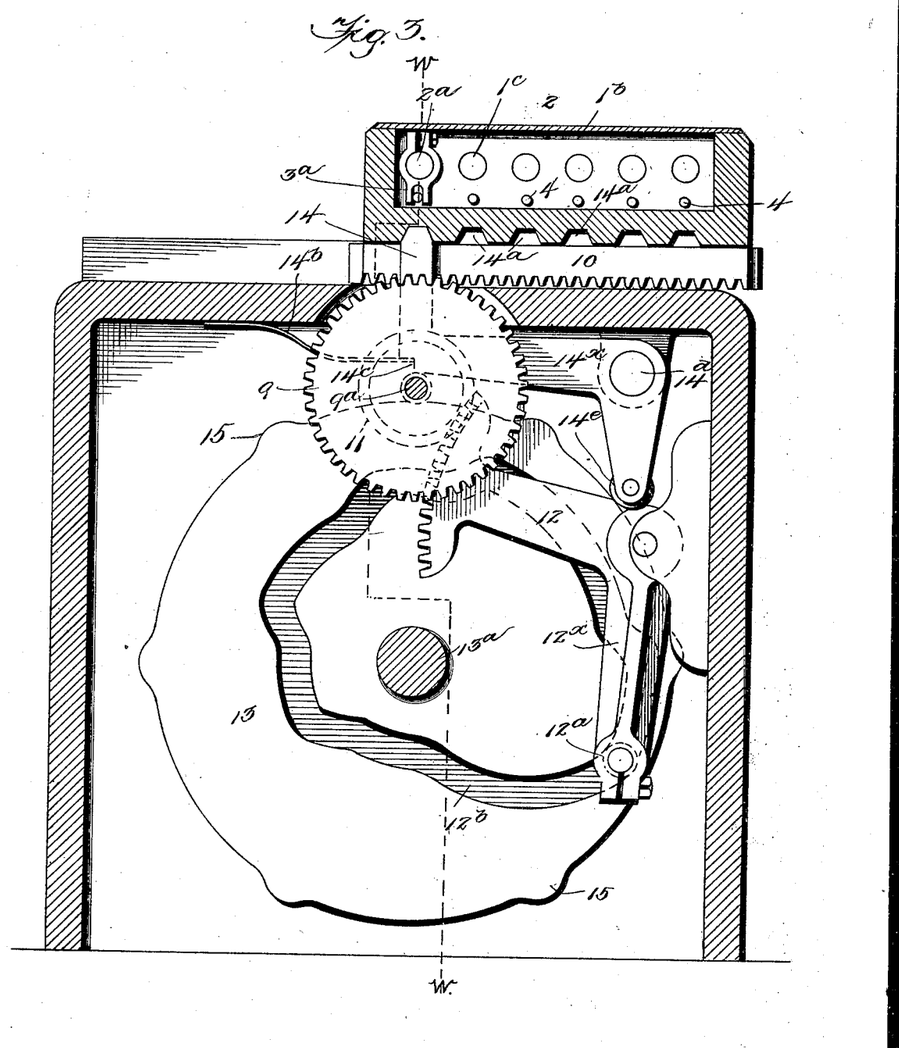
Fig. 3 is an enlarged sectional view taken at right angles to the plane of the last-referred-to view, taken on the line $x\,x$ of Fig. 2.
Figure 4:
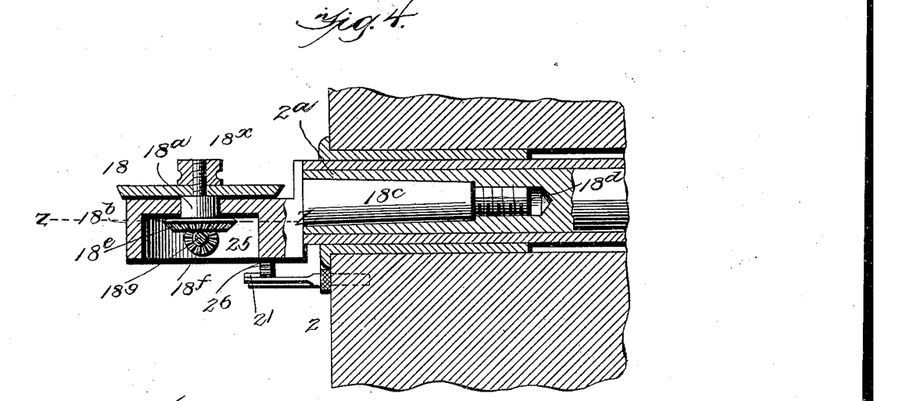
Fig. 4 is an enlarged section showing more particularly the cutter for severing the wire or stock, taken on the line $y\,y$ of Fig. 5.

A cam 8, secured upon a shaft $9^x$, journaled and supported in the frame 1 and suitably driven, actuates the lever 7, imparting a reciprocating motion thereto, the lower end of said lever or a roll $7^a$ thereon engaging a tortuous groove $8^a$ of said cam, said groove alternating back and forth from right to left, with its more extended arms traversing the circumference of the cam in lines parallel with the sides thereof and its shorter arms connecting the first-named arms at their ends angularly, not as abruptly, however, as a right angle, as disclosed in Fig. 2. Said tool-carrier itself is operated or moved intermittently, as above noted, by means of a pinion 9, secured upon a shaft $9^a$, suitably journaled or hung in the frame 1, said pinion gearing with the teeth of a rack 10, depending from said carrier. Said shaft has secured thereto a second smaller pinion 11, geared to a toothed or cogged quadrant or sector 12, having its integral angular arm or lever $12^x$ suitably fulcrumed at its angle within the frame 1, the lower end of said arm carrying a laterally-hung roll or pin $12^a$, engaging or traveling in a cam-groove $12^b$ in one side of a disk 13, secured upon the shaft carrying the cam 8. In order to effect the retention of the tool-carrier 2 at the required point after each impulse of each intermittent motion, I provide a dog 14, having its upper beveled point engaging a series of notches or recesses $14^a$ in the under side of said tool-carrier. Said dog is caused to automatically engage the notches $14^a$ of said tool-carrier and upheld by the upward pressure of a spring $14^b$, suitably secured to the frame 1 at one end and bearing at its opposite end against a shoulder formed, preferably, by an undercut $14^c$, suitably provided in said dog. Said dog has an integral right-angular arm $14^x$, pivoted, as at $14^d$, in the frame 1, with the lower end of said arm, a roll $14^e$ thereon adapted to be engaged at regular intervals or intermittently by preferably rounded projections or elevations 15, formed upon the perimeter of the cam-groove disk 13, before referred to, to suitably retract or disengage said dog from the notches $14^a$ of said tool-carrier step by step as said tool-carrier is intermittently moved in disposing the several tools with relation to the stock or wire to be treated for the reception of the jewels.

A chuck $14^{xx}$ for holding and feeding the stock or wire to be operated on to the tools and means for supporting and actuating said chuck are of a construction substantially as heretofore in use. Said chuck is caused to grasp and release the stock or wire as required by accordingly manipulating a hand-lever $14^f$, a sliding spindle $14^g$, arranged within the arbor $14^h$, carrying said chuck, and a sleeve $14^i$, adapted to engage a nut $14^k$ on the rear end of said spindle, having loosely journaled thereon a ring or collar $14^l$, to which are pivoted lateral arms $14^m$, which, together with a third arm $14^n$ and a link $14^o$, complete the connection between said chuck-spindle-actuating sleeve and arm and said hand-lever. The arms $14^m$ and $14^n$ are connected to a common pivot $14^p$, suitably secured to and projecting from a frame or support, and the link $14^o$ connects the arm $14^n$ to the hand-lever $14^f$. Said chuck-carrying spindle $14^q$ is driven by a pulley $14^{gg}$, suitably connected with driving power, and the arbor $14^h$, carrying the head-stock $14^u$, is belted to and also driven from said power.

Upon the shaft $9^x$ is fixed a worm-wheel $14^q$, geared to a worm $14^r$, suitably journaled in position upon the supporting-frame, and upon one end of the shaft of said worm is suitably fixed a driving-pulley (not shown) driven from a suitable source of power by a belt (not shown) for transmitting motion to the shaft $9^x$ alternately.

Figure 14:
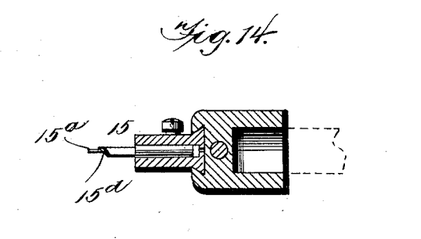
Figs. 14 and 15 are detailed views of the burnisher.
Figure 15:
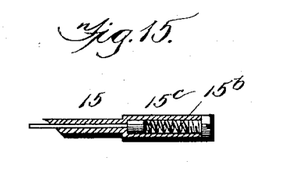
Figure 17:
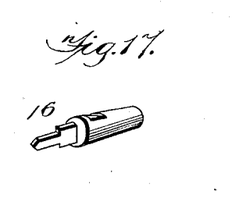
Fig. 17 is a like view of the drill or reamer.
Figure 18:
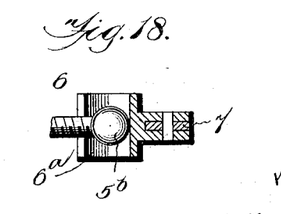
Fig. 18 is a longitudinal section taken through the coupling-bar, between the tool-carrying spindles and the cam-actuated lever therefor, on the line $b\,b$ of Fig. 2.

Among the various equipments of this class of machines are a burnisher, as 15, Figs. 14 and 15, a drill or reamer, as 16, Fig. 17, a jewel-setting casing or holder, as 17, Figs. 8, 9, 10, 11, 12, and 13, a cutter, as 18, also an additional cutter 19, and there may be still others. The reamer or drill 16, which is used to countersink or bore out the end of the stock or wire for the reception of the jewel or stone, may be of the construction substantially as shown and suitably held in one of the spindles of the carrier, as will be readily understood. Said burnisher 15 consists of a spring-cushioned stem or needle $15^a$, receiving the stress of a spring $15^b$, suitably housed in a casing $15^c$, and of a beveled or obliquely-pointed tubular cutter or blade $15^d$, through which said stem or needle is passed and which effects the upsetting of the stock or wire around the stone or jewel in performing the operation of setting the jewel. Said burnisher is clamped or held in position in a spindle, as indicated in Fig. 14, in the slide or carrier 2.

Figures 5, 6, 7:
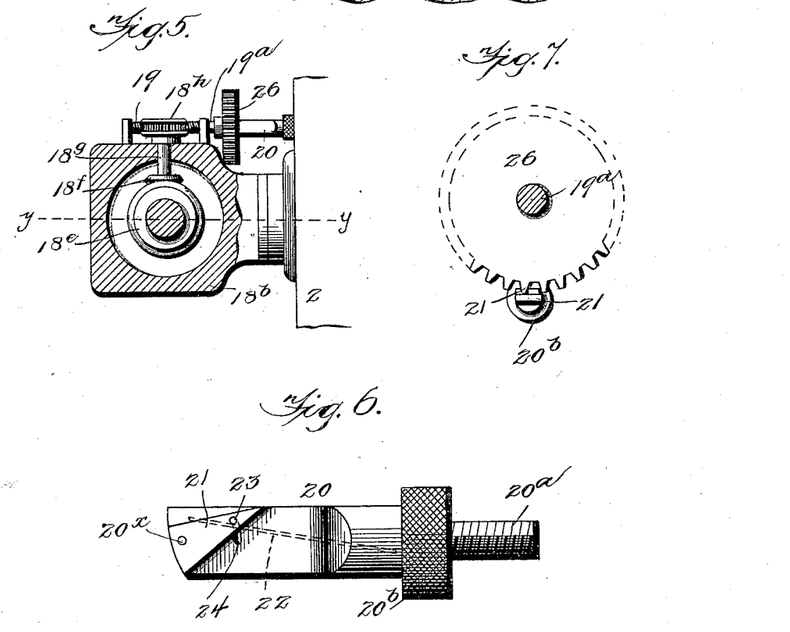
Fig. 5 is a similar section taken at right angles to the plane of the last-referred-to section on the line $z\,z$ of Fig. 4.
Fig. 6 is a detailed plan view of the dog forming part of the cutter-actuating mechanism for regulating or determining the movement of the cutter.
Fig. 7 is also a detailed view showing said dog and a gear-wheel in coaction.
Figure 8:
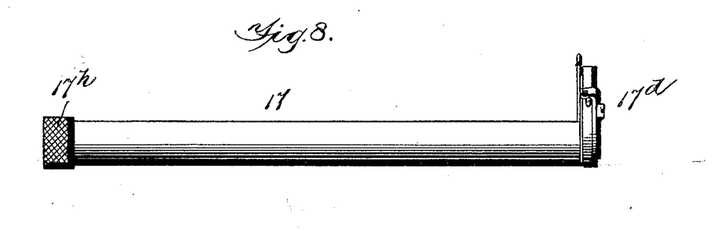
Figs. 8, 9, 10, and 11 are detached views of the jewel-feeding device.
Figure 9:
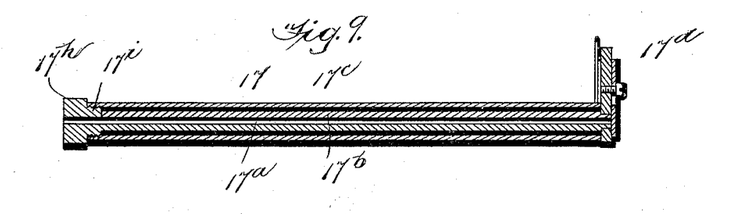
Figure 10:
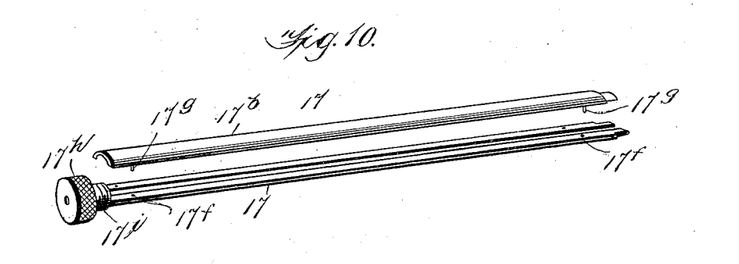
Figure 11:
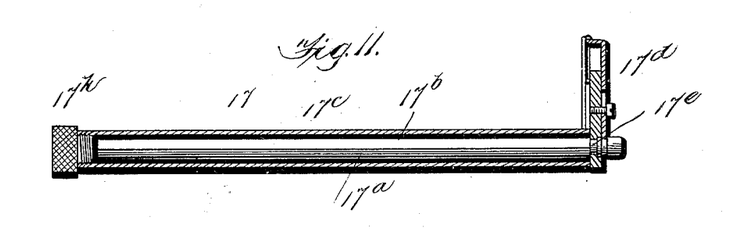
Figures 12, 13:
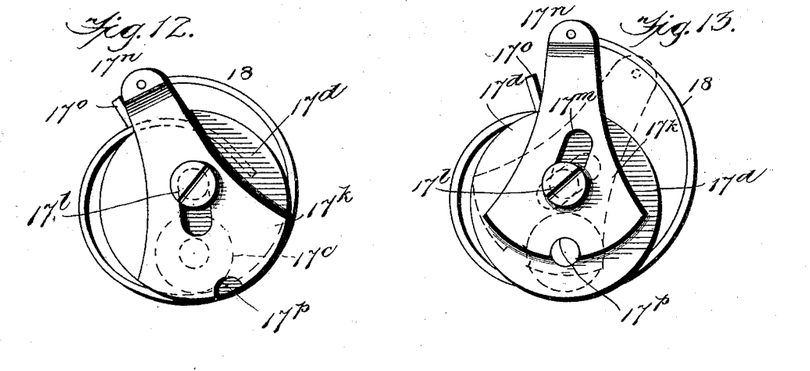
Figs. 12 and 13 are enlarged detail views showing more fully the delievery end of the jewel-feeding device.

The cutter 18, of general disk form and having its periphery beveled to form the cutting edge at its upper corner, is carried by a screw-threaded shaft or spindle $18^x$, projecting upward from a cylindric boss or hub $18^a$, let into a corresponding opening in a case or support $18^b$, itself having a tapered lateral extension or arm $18^c$, fitting into a corresponding socket in one end of one spindle, with a reduced straight screw-threaded terminal $18^d$, making connection with a similar screw-threaded extension of said socket. Said boss $18^a$ is integral with a horizontal beveled pinion or wheel $18^e$, facing downward, and with this pinion meshes or gears a vertical corresponding pinion $18^f$, secured to a shaft $18^g$, suitably supported in position. Said shaft $18^g$ also carries a worm-wheel $18^h$, geared to a worm 19, carried by a shaft $19^a$, suitably supported in position. A bracket or arm 20, having a screw-threaded extension or terminal $20^a$, is screwed into the carrier 2 at a point below and one side of the support or case $18^b$ and held more securely in place by a milled jam-nut $20^b$, screwing upon the part $20^a$ and adapted to bind or jam against the carrier 2. Upon the arm or bracket 20 is pivoted, as at $20^x$, a preferably triangular dog or pawl 21, having the vertical edge of its point held normally just beyond the right side or edge of said arm by a preferably flat edgewise-arranged spring 22, having one end suitably secured to said arm, its free end bearing against a pin 23, depending from said dog, through a slot 24 in said arm, as more particularly seen in Fig. 6. Upon the shaft $19^a$ is also secured a toothed wheel or pinion 26, whose teeth are adapted to be engaged by the dog or pawl 21 as the cutter 18, with its support $18^b$, is moved by its carrying-spindle away from and toward the carrier 2 in changing the presentation of the cutting edge of the cutter, as presently more clearly apparent. After each cutting operation or each time the cutter is used it is desirable to present a different portion of its effective or cutting edge to the stock or wire. Therefore as the wheel 26 moves bodily inward as the spindle is accordingly moved a tooth of said wheel will, as the spindle reaches the limit of its inward movement, readily snap past the point of said dog to a point at the opposite side of said dog, and consequently as the spindle is moved outward away from the carrier, carrying with it said wheel, said tooth will be engaged by the left or divergent edge or side of said dog. This of course will cause the wheel to turn to that extent, and accordingly turn the cutter through the intermediate gearing, &c. Upon the spindle reaching the limit of its outward movement the dog or pawl will have cleared the tooth of the wheel, thus providing for the like engagement of the pawl or dog with a successive tooth of the wheel, and the consequent repetition of the foregoing operation. The case or support $18^b$ is adapted to permit the cutter 18 to overhang or project beyond it to permit the requisite contact of said cutter with the stock or wire in acting upon the last named.

Figure 1:
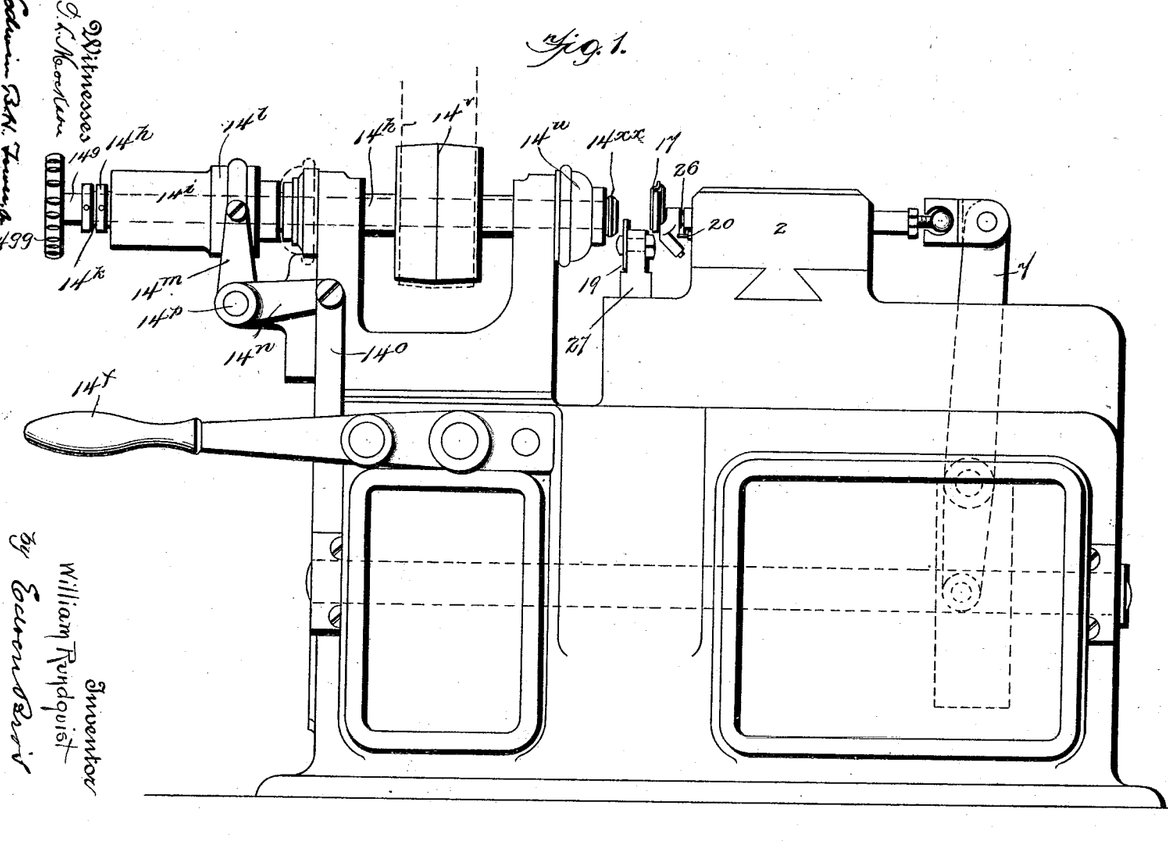
Figure 1 is a side elevation.
Figure 16:
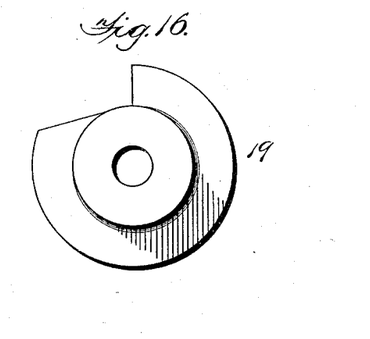
Fig. 16 is an enlarged detailed view of an additional cutter.

The additional or vertical cutter 19, fixed or carried upon a slide or holder 27, suitably supported in the frame or support 1 and engaged at intervals by a cam 28, mounted upon the shaft $9^x$, is arranged, as shown in Figs. 1 and 2, suitably for severing the stock or wire into required lengths for forming the settings for the jewels. Said cutter in general outline is circular with a segment thereof removed, as shown in Fig. 16, the upstanding or vertical portion forming the cutting edge, by the contact of which with the stock or wire carried around by the head-stock the cutting operation is effected.

The jewel-holder 17, cylindrical in general construction, comprises an inner two-part or sectional tube $17^a$ $17^b$ and an outer tube or casing $17^c$, adapted to contain the former, also having a preferably circular feeder or head $17^d$, fixed at one end of the tube or casing $17^c$ and having an aperture $17^e$ therethrough registering with the chamber of the inner tube $17^a$ $17^b$, through which the jewels are fed or passed to the wire or stock for setting. Said inner tube has its sections or parts adapted to fit into the aperture $17^e$, somewhat enlarged for that purpose, the inner ends of said sections being accordingly reduced to fit thereinto. The sections or parts of the inner tube are provided with registering pins and holes $17^f$ $17^g$, respectively, in their longitudinal flat meeting edges to aid in readily alining said parts in assembling and disassembling the same. One of said sections or parts has at one end a preferably milled enlargement or head $17^h$ for the ready grasping and handling of the holder in inserting and withdrawing the same from the spindle carrying it. Also at said end of said section is a slight cylindric enlargement or shoulder $17^i$, having an external screw-thread engaging an internal screw-thread of the outer tube or casing $17^c$ to provide for effecting connection therebetween and the ready detachability of the parts, as when it is desired to "load" the holder or inner tube with jewels, providing for the doing thereof much more quickly and without the aid of a separate contrivance therefor, as heretofore. The head or feeder $17^d$ at one end of the tube or casing 17 has suitably pivoted thereto, as at $17^l$, a valve or gate $17^k$, the pivot $17^l$ being enlarged at its outer end and projecting centrally from said head through an elongated slot $17^m$ produced in said valve or gate. Said gate, preferably of the construction shown, has connected to its upper end a spring 18, preferably, as shown, being a spring-wire having its opposite end secured to said head upon the rear side, the purpose of said spring being to automatically return said gate or valve to its closed or initial position after the feeding or passing of a jewel therefrom to the blank and its release thereafter, thus preventing the escape of the jewels remaining in the holder. The preferable way of making connection between said gate or valve and spring is by bending or curving back the upper end of said gate, as at $17^n$, and producing the thus bent-back portion of said gate or valve with an aperture receiving one end of said spring. A stop or pin $17^o$, inserted in the edge of the head or feeder $17^d$, limits or determines the movement of the gate or valve $17^k$ as against the action of the spring 18. Said gate or valve has a preferably semicircular notch 17ᵖ in its lower edge, which as the gate or valve is moved into the dotted-line position permitted by the slot 17ᵐ in said gate registers with the feeding-opening of the holder to provide for the feeding or forcing of the jewels therethrough to the blank, which may be effected by subjecting them to compressed air.

Having thus fully described my invention, what I claim as new, and desire to secure by Letters Patent, is—

1. The combination of a spindle having a terminal enlargement, a coupling-head having a cylindric socket and a longitudinal slot through its forward side to receive said enlargement and spindle, both said socket and slot opening at both ends of said coupling-head, and means for moving said coupling-head at right angles to the length of said spindle, substantially as set forth.

2. The combination of a spindle having a terminal enlargement, a coupling-head having a cylindric socket and a longitudinal slot through its forward side to receive said enlargement and spindle, both said socket and slot opening at both ends of said coupling-head, means for moving said coupling-head at right angles to the length of said spindle, and means for intermittently actuating said coupling-head and spindle, substantially as set forth.

3. The combination of a blank or stock carrying device, a carrier equipped with tool-spindles and adapted to move at right angles to said device means for actuating said tool-spindles and a common coupling device between said tool-spindles and said actuating means for successively receiving said spindles, substantially as set forth.

4. The combination of a blank or stock carrying device or head-stock, a carrier equipped with tool-spindles and adapted to move at right angles to said head-stock, means for imparting such movement to said carrier, means for actuating said tool-spindles and a common coupling device comprising a cylindric socket with a longitudinal slot therethrough, both said socket and slot opening at both ends, to connect up said socket successively with said tool-spindles, substantially as set forth.

5. The combination of a blank or stock carrying device or head-stock, a carrier equipped with tool-carrying spindles, and adapted to move at right angles to said stock-carrying device, means for imparting such movement to said carrier a cam or intermittently-actuated lever for actuating said spindles and a common coupling device for successively effecting connection between said tool-spindles and said intermittently-actuated lever, substantially as set forth.

6. The combination of a stock or blank carrying device, a carrier equipped with tool-carrying spindles, and movable at right angles to said stock-carrying device, a gear-and-rack mechanism for actuating said carrier, means for actuating said tool-spindles and a common coupling device for successively effecting connection between said tool-spindles and said actuating means, substantially as set forth.

7. The combination of a stock or blank carrying device, a carrier equipped with tool-spindles and movable at right angles to said tool-carrying device, a gear-and-rack mechanism for actuating said carrier, and an intermittently-actuated lever for operating said spindles, substantially as set forth.

8. The combination of a stock or blank carrying device, a carrier having movement at right angles thereto, and equipped with tool-carrying spindles, an intermittently-actuated lever for said spindles, a coupling between said spindles and lever, and a rack-and-gear mechanism for said carrier, substantially as set forth.

9. The combination of a stock or blank carrying device, a carrier having an intermittent movement at right angles thereto and equipped with tool-spindles, means for imparting such movement to said carrier, means for actuating said tool-spindles, a coupling between said spindles and said means for actuating said spindles, and an intermittently-actuated dog or detent engaging said carrier, substantially as set forth.

10. The combination of a stock or blank holding device, a carrier having an intermittent movement at right angles thereto, and equipped with tool-spindles, an intermittently-actuated rack-and-gear mechanism for said carrier, a corresponding actuated dog or detent for said carrier, and means for actuating said tool-spindles, a coupling between said spindles and said means for actuating said spindles, substantially as set forth.

11. The combination of a stock or blank holder, a carrier equipped with tool-spindles having movement at right angles to said holder, a gear-and-rack mechanism for said carrier, a cam-actuated dog or detent for said carrier, and a cam-actuated lever for said tool-spindles, substantially as set forth.

12. The combination of a stock or blank holder, a carrier equipped with tool-spindles and having movement at right angles to said holder, means for imparting an intermittent rectilinear movement to said carrier, and means for transmitting an intermittent back-and-forth movement or stroke to said tool-spindles and a coupling device between said tool-spindles and the means for actuating said tool-spindles, substantially as set forth.

13. The combination of a carrier equipped with tool-spindles, an intermittently-actuated lever for actuating said spindles, means for imparting a rectilinear movement to said carrier and a coupling between said tool-spindles and lever, adapted to permit the lateral insertion thereinto and the corresponding withdrawal therefrom, of said spindles, substantially as set forth.

14. The combination of a stock or blank holder, a movable and intermittently-actuated carrier equipped with tool-spindles and having movement at right angles with said holder, a cam-actuated lever adapted to control or transmit movement to said tool-spindles, a coupling forming connection between said tool-spindles and lever, and an intermittently-detaining device for said carrier, substantially as set forth.

15. The combination of a carrier equipped with tool-spindles and having a rack, a gear-wheel or pinion meshing with said rack, means for actuating said spindles, an additional pinion on the shaft of the first-named pinion, a toothed sector or quadrant meshing with said additional pinion, and means for actuating said toothed sector, substantially as set forth.

16. The combination of a tool-spindle carrier, means for actuating the same, a dog or detent, adapted to engage said carrier, and having a right-angled arm, and a disk having cam projections upon the periphery adapted to engage said arm, and retract said dog or detent from said carrier, substantially as set forth.

17. The combination of a carrier having rectilinear movement, tool-spindles mounted in said carrier, springs arranged in connection with, and acting upon, said spindles, collars secured upon said spindles, guide-rods secured to said carrier, said collars having bifurcated portions engaging said guide-rods, and means for actuating said spindles, substantially as set forth.

18. The combination of a carrier, a spindle mounted in said carrier, a horizontal cutter, a case or support mounted in said spindle, a shaft bearing said cutter, and journaled in a support or case, a dog or pawl suitably supported upon said carrier, and gearing for actuating said cutter, said dog adapted to engage a pinion of said gearing as said spindle is actuated, substantially as set forth.

19. The combination of a carrier, a horizontal cutter suitably supported in a spindle of said carrier, gearing for actuating said cutter, and a triangular pivoted dog or pawl suitably supported upon said carrier and adapted to engage a pinion of said gearing as said spindle is actuated, substantially as set forth.

20. The combination of a carrier, a horizontal cutter suitably supported in a spindle of said carrier, gearing for actuating said cutter, a bracket or arm projecting from said carrier, a triangular dog or pawl pivoted upon said bracket and adapted to engage a pinion of said gearing, and having a pin or pendant extending through a slot in said bracket, and engaged by a spring secured to said bracket, substantially as set forth.

21. In a machine of the character described, the combination of a spindle-carrier, a horizontal cutter secured upon a shaft having a beveled pinion secured thereto, a support for said shaft having an arm secured in a spindle of said carrier, a second shaft bearing also a beveled pinion geared to the first-named pinion and carrying a worm-wheel, a third shaft bearing a gear-wheel, and a spring-pressed triangular pivoted dog or pawl carried by said bracket or support secured to said carrier, said dog or pawl adapted to engage said gear-wheel, substantially as set forth.

22. In a machine of the character described, the combination with a spindle of the tool-spindle carrier, of a jewel-holder comprising a tubular portion having a circular feeder at one end, and a spring-pressed pivoted gate or valve having an elongated slot therethrough receiving its pivot, and a notch in its lower end registering with the feeding-opening of said tubular portion, substantially as set forth.

23. The combination with a spindle of the tool-spindle carrier, of the jewel-holder comprising a tubular portion and a circular feeder having a pivoted valve or gate with an elongated slot therethrough for the reception of its pivot, and a spring with one end secured to said circular head and its other end connected to an extension of said gate or valve, substantially as set forth.

24. The jewel-holder comprising an outer tube or casing provided at one end with a head or feeder, and an inner sectional tube, with one end adapted to fit into an enlargement of the feeding-opening of said head, and its opposite end having a screw-threaded enlargement engaging an internal screw-thread of one end of said outer tube or casing, substantially as set forth.

25. The combination with a spindle of the tool-spindle carrier, of a jewel-holder comprising a tubular portion having a circular head or feeder at one end, a pivoted spring-pressed gate or valve having a notch in its lower edge adapted to register with the feeding-opening of said head, and a stop projecting from the edge of said head and adapted to engage an extension of said gate or valve, substantially as set forth.

In testimony whereof I affix my signature in presence of two witnesses.

WILLIAM RUNDQUIST.

Witnesses:
 GEO. E. ALLEN,
 W. H. KIRKLAND.